United States Patent
Miller et al.

(10) Patent No.: US 11,302,991 B2
(45) Date of Patent: Apr. 12, 2022

(54) OXIDATION PROTECTED SEPARATOR

(71) Applicant: Daramic, LLC, Charlotte, NC (US)

(72) Inventors: Eric H. Miller, Philpot, KY (US); J. Kevin Whear, Utica, KY (US); Jeffrey K. Chambers, Philpot, KY (US)

(73) Assignee: Daramic, LLC, Charlotte, NC (US)

( * ) Notice: Subject to any disclaimer, the term of this patent is extended or adjusted under 35 U.S.C. 154(b) by 131 days.

(21) Appl. No.: 15/972,741

(22) Filed: May 7, 2018

(65) Prior Publication Data

US 2018/0254461 A1  Sep. 6, 2018

Related U.S. Application Data

(62) Division of application No. 14/200,102, filed on Mar. 7, 2014, now Pat. No. 9,991,487.

(Continued)

(51) Int. Cl.
*H01M 50/411* (2021.01)
*H01M 10/12* (2006.01)
(Continued)

(52) U.S. Cl.
CPC ......... *H01M 50/411* (2021.01); *H01M 10/12* (2013.01); *H01M 50/403* (2021.01);
(Continued)

(58) Field of Classification Search
CPC .. H01M 2/1653; H01M 2/162; H01M 2/1613; H01M 2/1626; H01M 10/12;
(Continued)

(56) References Cited

U.S. PATENT DOCUMENTS 3,496,019 A  2/1970  Fiedler
4,438,185 A  3/1984  Taskier
(Continued)

FOREIGN PATENT DOCUMENTS

JP    11-016561 A     1/1999
KR    10-0647966 B1  11/2006
WO    WO 39859384 A1 12/1998

OTHER PUBLICATIONS

K. Ihmels et al., "Chapter 7, Separator Materials for Valve-Regulated Lead-Acid Batteries," Elsevier B.V., 2004, D.A.J. Rand et al. editors, pp. 183-205.

(Continued)

*Primary Examiner* — Jonathan G Jelsma
(74) *Attorney, Agent, or Firm* — Hammer & Associates, P.C.

(57) ABSTRACT

A battery separator for a lead/acid battery is resistant to oxidation arising from the use of water or acid containing contaminants, for example chromium (Cr), manganese (Mn), titanium (Ti), copper (Cu), and the like. The separator is a microporous membrane including a rubber. The rubber is no more than about 12% by weight of the separator. The rubber may be rubber latex, tire crumb, and combinations thereof. The rubber may be impregnated into the microporous membrane. The microporous membrane may be a microporous sheet of polyolefin, polyvinyl chloride, phenol-formaldehyde resins, cross-linked rubber, or nonwoven fibers. A method for preventing the oxidation and/or extending battery life of the separator is also included.

9 Claims, 2 Drawing Sheets

Related U.S. Application Data

(60) Provisional application No. 61/774,160, filed on Mar. 7, 2013.

(51) Int. Cl.
  *H01M 50/429* (2021.01)
  *H01M 50/44* (2021.01)
  *H01M 50/403* (2021.01)
  *H01M 10/06* (2006.01)
  *H01M 50/431* (2021.01)

(52) U.S. Cl.
  CPC ............ *H01M 50/44* (2021.01); *H01M 10/06* (2013.01); *H01M 50/4295* (2021.01); *H01M 50/431* (2021.01)

(58) Field of Classification Search
  CPC ...... H01M 10/06; H01M 2/1686; H01M 2/14; H01M 2/28; H01M 10/121; H01M 4/628; H01M 4/14; H01M 4/68; H01M 4/685; H01M 2004/021; H01M 2300/0005; H01M 50/411; H01M 50/429; H01M 50/4295
  See application file for complete search history.

(56) References Cited

U.S. PATENT DOCUMENTS

| | | |
|---|---|---|
| 5,154,988 A | 10/1992 | Choi |
| 5,221,587 A | 6/1993 | Bohnstedt et al. |
| 5,989,750 A | 11/1999 | Ohba et al. |
| 6,242,157 B1 | 6/2001 | Paik et al. |
| 6,403,253 B1 | 6/2002 | Wainwright |
| 6,458,491 B1 | 10/2002 | Wimberly et al. |
| 6,511,771 B1 | 1/2003 | Clough |
| 7,767,333 B2 | 8/2010 | Kakizaki et al. |
| 2005/0186479 A1 | 8/2005 | Totsuka et al. |
| 2006/0127661 A1* | 6/2006 | Pekala ............... C08K 3/36 428/304.4 |
| 2012/0070747 A1 | 3/2012 | Whear |
| 2012/0270110 A1 | 10/2012 | Waterhouse et al. |
| 2013/0071723 A1 | 3/2013 | Wertz et al. |

OTHER PUBLICATIONS

Jorg Deiters et al., "A New Polyethylene Separator for Heavy-Duty Traction Batteries," Journal of Power Sources 158 (2006), Elsevier B.V., pp. 1069-1072.

M.L. Sorita et al., "Development of High Power VRLA Batteries Using Novel Materials and Processes," Journal of Power Sources 5111 (2002), Elsevier B.V., pp. 1-12.

M. Perrin et al., "Effect of Compression on the Behaviour of Lead-Acid Batteries," Journal of Power Sources 4071 (2000), Elsevier B.V., pp. 1-12.

M. Perrin et al., "Extending Cycle Life of Lead Acid Batteries: A New Separation System Allows the Application of Pressure on the Plate Group," Reference info not available.

\* cited by examiner

OXIDATION PROTECTED SEPARATOR

RELATED APPLICATIONS

This application claims the benefit of and priority to U.S. patent application Ser. No. 14/200,102 filed Mar. 7, 2014, now U.S. Pat. No. 9,991,487, which claimed the benefit of and priority to U.S. provisional application No. 61/774,160 filed Mar. 7, 2013, both of which are incorporated herein by reference.

FIELD OF THE INVENTION

The present invention is directed to a battery separator for lead/acid batteries being resistant to oxidation arising from the use of water and/or acid containing contaminants.

BACKGROUND

Oxidation of the separator, e.g., separators for lead/acid batteries, reduces a battery's cycle life, and thereby reduces the effective life of the battery. Oxidation causes the embrittlement (measured by, for example, loss of % elongation) of the separator which leads to partial or complete failure of the battery.

Contaminants typically originate from the water and/or the sulfuric acid added to a battery, as well as from impurities in the alloys and active materials that comprise the electrode plates, may cause oxidation. Such contaminants typically include the transition metals of the periodic table, for example: chromium (Cr), manganese (Mn), titanium (Ti), copper (Cu), and the like. Contaminant levels (e.g., Cr, Mn, and/or Ti) of greater than about 2.0 ppm [2.0 mg/L] are not recommended. Cu contaminants greater than 26 ppm [26 mg/L] are not recommended. In batteries without contaminants (e.g., Cr), the separator may have a life of about 7 years, but with contaminants (e.g., 5 ppm Cr), the separator deteriorates in about 6 months.

In some areas of the world, for example, Asia, lead/acid batteries are sold as 'dry charge' batteries. These dry charge batteries are purchased without the water/acid included. The dry charge battery has a longer shelf life. However, the user may not be careful to fill the battery with uncontaminated water/acid. The contaminated water/acid will lead to oxidation of the separator and ultimately to battery failure. The contaminants in the water/acid may be sourced from the water/acid containers, e.g., steel drums.

USPN5221587 discloses the use of latex in the separator to prevent antimony (Sb) poisoning of the lead/acid battery. Antimony poisoning does not cause separator oxidation; instead, antimony poisoning causes water loss from the electrolyte. Antimony is sourced from the lead plates (electrodes) of the battery. Antimony is used as an alloying agent in the lead to improve the manufacture of the plates and the cycle life of the battery. Those of ordinary skill would not consider the teachings of USPN5221587 in arriving at a solution to the separator oxidation problem mentioned above.

USPN6242127 discloses the use of cured, porous rubber in a conventional polyolefin separator to improve the electrochemical properties (antimony suppression) of the separator.

SUMMARY OF THE INVENTION

A battery separator for a lead/acid battery is resistant to oxidation arising from the use of water or acid containing contaminants, for example chromium (Cr), manganese (Mn), titanium (Ti), copper (Cu), and the like, and combinations thereof. The separator is a microporous membrane including a rubber. The rubber is no more than about 12% by weight of the microporous membrane. The rubber may be rubber latex, tire crumb, and combinations thereof. The rubber may be impregnated into the microporous membrane. The microporous membrane may be a microporous sheet of polyolefin, polyvinyl chloride, phenol-formaldehyde resins, cross-linked rubber, or synthetic nonwoven fibers. A method for preventing the oxidation of the separator is also included.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DESCRIPTION OF THE INVENTION

Figure 1:
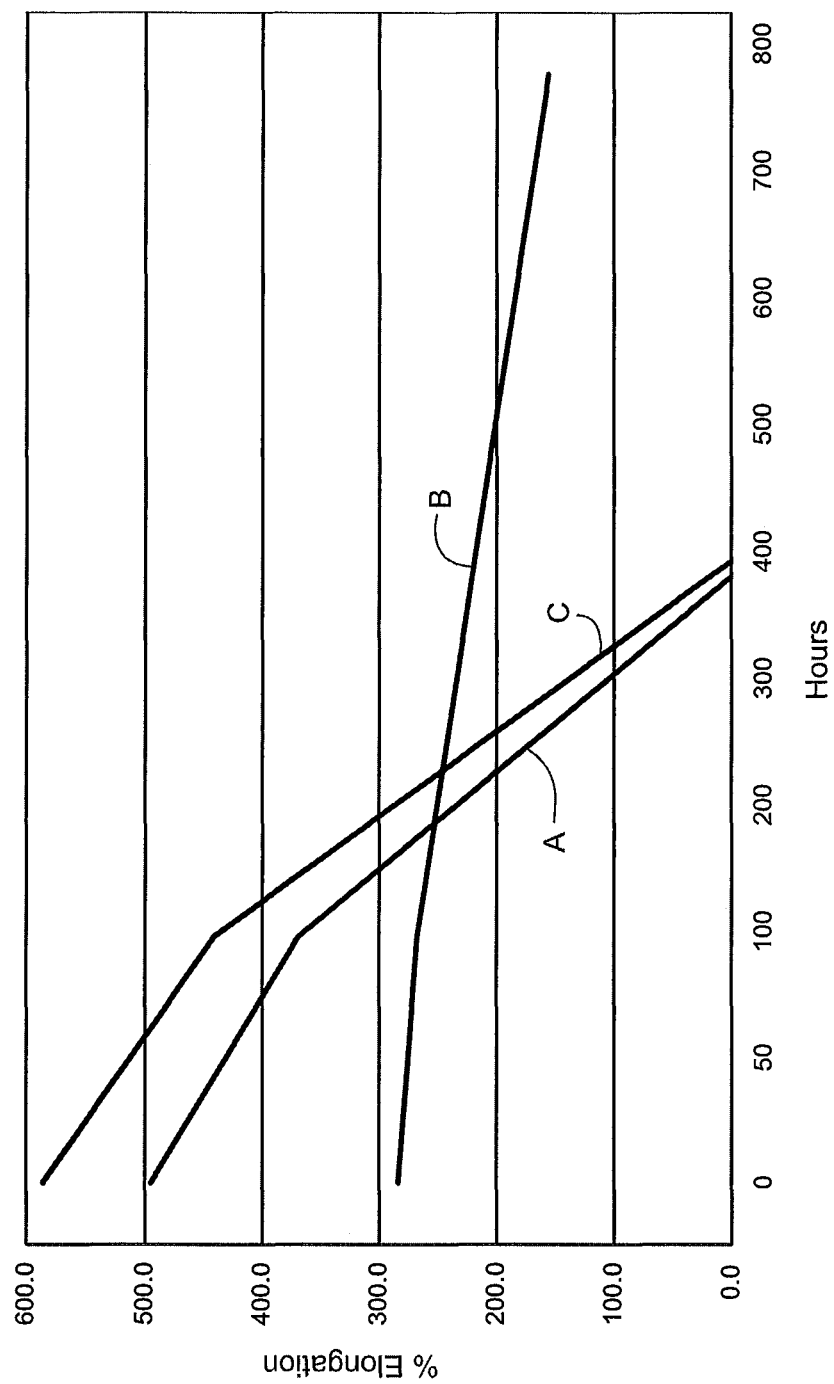
FIG. 1 is a graphical comparison of the oxidation resistance, presented as % elongation as a function of hours, of an inventive separator (B) to other known separators when the separators are subjected to a water containing 4.7 ppm chromium (Cr).
Figure 2:
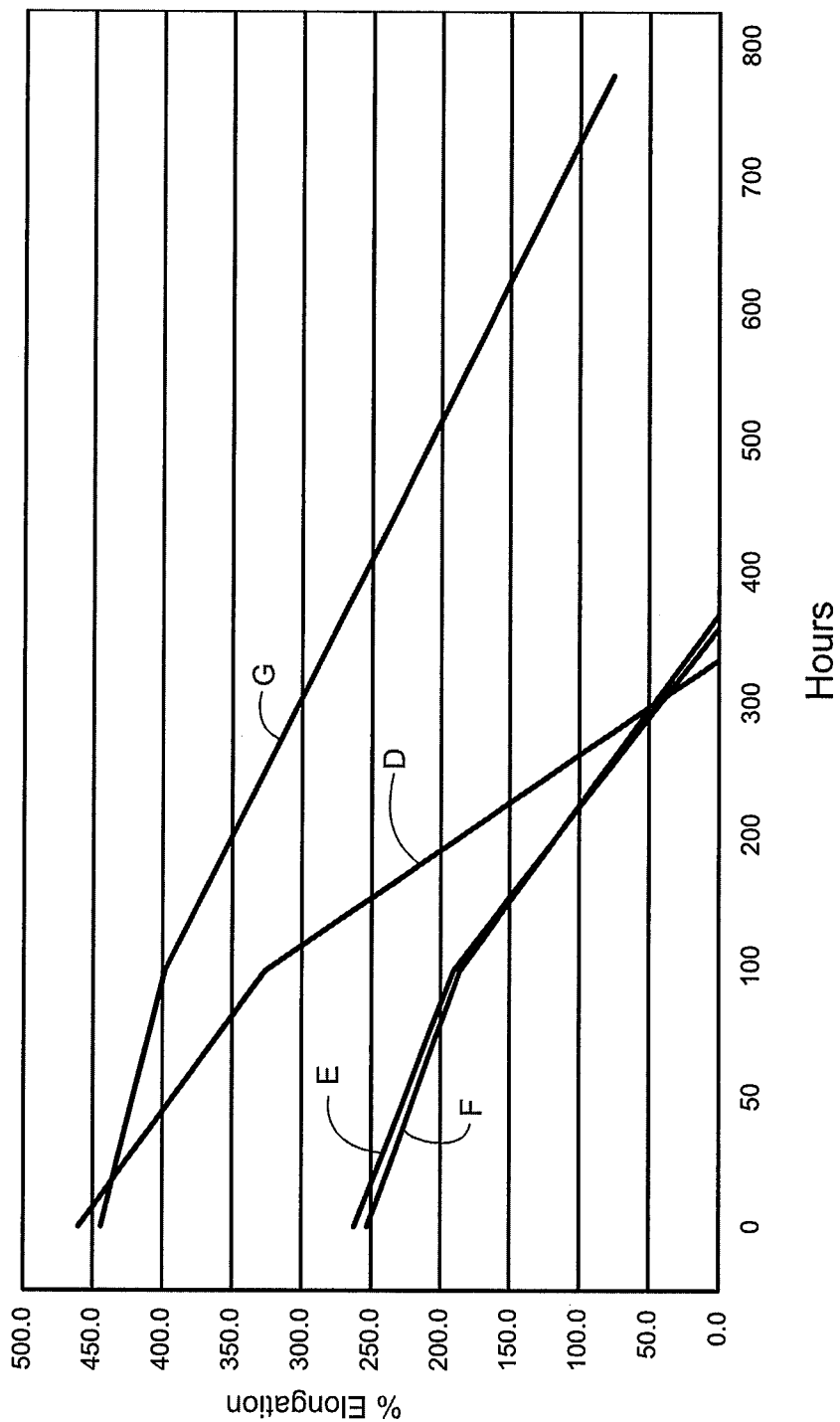
FIG. 2 is a graphical comparison of the oxidation resistance, presented as % elongation as a function of hours, of an inventive separator (G) to other known separators when the separators are subjected to a water containing 4.5 ppm chromium (Cr).

Lead/acid batteries are well known, see for example, Linden, *Handbook of Batteries*, $2^{nd}$ Edition, McGraw-Hill, Inc. New York, N.Y. (1995) and/or Besenhard, *Handbook of Battery Materials*, Wiley-VCH Verlag GmbH, Weinheim, Germany (1999), both incorporated herein by reference. In one embodiment, the separator, described hereinafter, may be used in a lead/acid battery. The battery may be, for example, a flooded, storage, ISS, EFB, carbon, or dry charge lead acid battery with, for example, leaf, piece, pocket, or envelope type or style separators, with or without glass mat.

The inclusion of rubber (discussed below) with the separator of the lead/acid battery can prevent, or reduce, oxidation of the separator caused by contaminants, such as Cr, Mn, Ti, and the like, and thereby increase the life cycles of batteries.

Separators, as used herein, refer to microporous membranes. Such separators are well known as demonstrated by reference to Besenhard, *Handbook of Battery Materials*, Wiley-VCH Verlag GmbH, Weinheim, Germany (1999), incorporated herein by reference. Microporous membranes may be made from: sheets of polyolefin (e.g., polyethylene, polypropylene, ultra high molecular weight polyethylene (UHMWPE), and combinations thereof), polyvinyl chloride (PVC), phenol-formaldehyde resins (including, for example, cellulosic and/or synthetic impregnated with phenol-formaldehyde resins), crosslinked rubber, or nonwoven (e.g., inert fibers including cellulosic fibers or glass fibers). In one embodiment, the microporous membranes may be made from polyethylene, UHWMPE, or a combination of both. In another embodiment, the microporous membrane is a polyolefin (polyolefin being high molecular weight PE and/or ultra high molecular weight PE)/filler (for example a silica filler)/processing oil, where the polyolefin/filler/processing oil are mixed and then extruded into a precursor (e.g., a flat sheet), then calendered to create a profile (e.g., ribs) and then the processing oil is extracted therefrom. The microporous membranes may have a ribbed profile. The ribs may be conventional, e.g., running in the machine direction (MD) on the side to the positive electrode (e.g., to, among other things, separate the separator from the positive electrode, and form gas channels that allow gas to escape and promotes mixing during over charge conditions), but the ribs may also extend in the cross machine direction (CMD) on the side to the negative electrode (to retard acid stratification).

Rubber, as used herein, refers to rubber latex, tire crumb, and combinations thereof. In one embodiment, the rubber may be un-cross-linked or uncured rubber. In another embodiment, the rubber latex may be natural or synthetic rubber latex. In another embodiment, the rubber may be natural rubber latex. In yet another embodiment, the rubber may be tire crumb. Natural rubbers may include, for example, any grade (e.g., latex grades), such as ribbed smoked sheet, white and pale crepes, pure blanket crepes or re-mills, thick brown crepes or ambers, and flat bark crepes. Natural rubbers may include Hevea rubbers. Synthetic rubbers may include, for example, methyl rubber, polybutadiene, chloropene rubbers, and copolymer rubbers. Copolymer rubbers may include, for example, styrene/butadiene rubbers, acrylonitrile/butadiene rubbers, ethylene/propylene rubbers (EPM and EPDM), and ethylene/vinyl acetate rubbers. Other rubbers may include, for example, butyl rubber, bromobutyl rubber, polyurethane rubber, epichlorhydrin rubber, polysulphide rubber, chlorosulphonyl polyethylene, polynorborene rubber, acrylate rubber, fluorinated rubber, isoprene rubber, and silicone rubber. These rubbers may be used alone or in various combinations.

In one embodiment, the rubber may be impregnated into the microporous membrane. Impregnated, as used herein, means that the rubber is incorporated into the body of the microporous membrane, and is not a layer formed on the microporous membrane. So, the rubber may be mixed or blended into one or more of the materials used to form the microporous membrane. The rubber, for example the latex, is still chemically active (i.e., uncured and/or uncrosslinked) after extrusion. Thus, the rubber is a component integral with, or distributed within, or uniformly blended throughout, or intimately blended in the materials of, the microporous membrane.

The rubber, as described above, may comprise any portion of the microporous membrane. In one embodiment, the rubber may comprise no more than about 12% by weight of the microporous membrane when added to the formulation (i.e., the 'by weight' of the raw materials before extrusion). In another embodiment, the rubber may comprise about 1-12% by weight of the microporous membrane. In another embodiment, the rubber may comprise about 1.2-6% by weight of the microporous membrane. In yet another embodiment, the rubber may comprise about 2-4% by weight of the microporous membrane. In still another embodiment, the rubber may comprise about 2.5-3.5% by weight of the microporous membrane. In another embodiment, the rubber may comprise about 3% by weight of the microporous membrane.

The microporous membrane may be made in any conventional fashion. Such processing is well known as demonstrated by reference to Besenhard, *Handbook of Battery Materials*, Wiley-VCH Verlag GmbH, Weinheim, Germany (1999), incorporated herein by reference. For example, in a PE separator (microporous membrane), the rubber, for example the latex, may be mixed with the processing oil and mixed with the PE during extrusion. The mixture is then extruded into a precursor (i.e., a flat sheet). Thereafter, the precursor is calendered to create a profile, for example ribs (as is conventional). Then, the processing oil is extracted from the profiled sheet, thereby creating the microporous membrane. The microporous sheet may be subjected to further processing steps as is conventional in the art of making separators for lead/acid batteries.

EXAMPLES

The following is a comparison of the inventive separators (Samples B & G) to other separators. The separators are compared on basis of % elongation (a measure of embrittlement, conventional testing) versus time (hours). % elongation is measured as set forth in ASTM D882. The PE separator refers to a conventional separator where polyolefin/filler/processing oil are mixed and extruded in to a flat precursor, calendered to create the profile, and then the processing oil is extracted therefrom, as is known in the art. The difference between 4.7 ppm and 4.5 ppm Cr is immaterial.

| Sample | Separator | Comment |
|---|---|---|
| A | PE separator laminated with synthetic nonwoven | No improvement in Cr oxidation resistance |
| B | PE separator with 6% by weight latex | Surprising improvement in Cr oxidation resistance |
| C | PE separator laminated with glass nonwoven | No improvement in Cr oxidation resistance |
| D | PE separator highly oriented | No improvement in Cr oxidation resistance |
| E | PE separator with 15% by weight residual processing oil | No improvement in Cr oxidation resistance |
| F | PE separator with proprietary commercial (alcohol-based) additive for oxidation resistance | No improvement in Cr oxidation resistance |
| G | PE separator (35% reduction of UHMWPE content) with 6% by weight latex | Surprising improvement in Cr oxidation resistance |

The present invention may be embodied in other forms without departing from the spirit and the essential attributes thereof, and, accordingly, reference should be made to the appended claims, rather than to the foregoing specification, as indicating the scope of the invention.

We claim:

1. A lead acid battery comprising:
an electrolyte comprising one or more contaminants, said one or more contaminants being one or more selected from the group consisting of chromium, manganese, titanium, copper, and combinations thereof; and
a separator positioned between a positive electrode and a negative electrode, wherein the separator comprises a microporous membrane comprising a microporous sheet of: (a) polyolefin and (b) about 6% uncured rubber, wherein the uncured rubber is uniformly blended with the polyolefin;
wherein the separator exhibits at least 100% elongation without break after 700 hours of exposure to 4.5 to 4.7 ppm Cr.

2. The lead acid battery of claim 1, wherein said uncured rubber being selected from the group consisting of rubber latex, tire crumb, and combinations thereof.

3. The lead acid battery of claim 1, wherein microporous membrane further comprises a first set of ribs on a first surface, and a second set of ribs on a second surface.

4. The lead acid battery of claim 3, wherein said first set of ribs are in a machine direction relative to said microporous membrane.

5. The lead acid battery of claim 3, wherein said second set of ribs are in a cross-machine direction relative to said microporous membrane.

6. The lead acid battery of claim 1, wherein said polyolefin is one or more of the group consisting of polyethylene, polypropylene, high molecular weight polyethylene ("HMWPE"), ultra-high molecular weight polyethylene ("UHMWPE"), and combinations thereof.

7. The lead acid battery of claim 6, wherein said microporous membrane further comprises silica.

8. The lead acid battery of claim 1, wherein the battery is a flooded lead acid battery.

9. The lead acid battery of claim 1, wherein the battery is a dry charge flooded lead acid battery.

\* \* \* \* \*